(12) United States Patent
McNulty et al.

(10) Patent No.: US 7,481,914 B2
(45) Date of Patent: Jan. 27, 2009

(54) PHOTOELECTROLYSIS CELLS, AND RELATED DEVICES AND PROCESSES

(75) Inventors: Thomas Francis McNulty, Ballston Lake, NY (US); Anant Achyut Setlur, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 305 days.

(21) Appl. No.: 11/394,881

(22) Filed: Mar. 31, 2006

(65) Prior Publication Data
US 2007/0227896 A1    Oct. 4, 2007

(51) Int. Cl.
*C25C 1/02*    (2006.01)
*C25B 11/06*   (2006.01)

(52) U.S. Cl. ............... 205/628; 204/291; 204/252; 204/266; 205/630; 205/637; 205/638

(58) Field of Classification Search ............... 204/252, 204/266, 291; 205/628, 630, 637, 638
See application file for complete search history.

(56) References Cited

U.S. PATENT DOCUMENTS

| | | | |
|---|---|---|---|
| 4,090,933 A | 5/1978 | Nozik | |
| 4,172,925 A | 10/1979 | Chen et al. | |
| 4,466,869 A * | 8/1984 | Ayers | 205/340 |
| 5,439,660 A * | 8/1995 | Jansen et al. | 423/263 |
| 5,693,102 A * | 12/1997 | Jansen et al. | 8/506 |
| 6,878,666 B2 * | 4/2005 | Domen et al. | 502/200 |
| 6,936,143 B1 | 8/2005 | Graetzel et al. | |
| 2007/0119706 A1* | 5/2007 | McNulty et al. | 204/252 |

OTHER PUBLICATIONS

D. Yamasita et al., "Recent progress of visible-light-driven heterogeneous photocatalysts for overall water splitting", Solid State Ionics, vol. 172, 2004, pp. 591-595.
M. Jansen et al., "Inorganic yellow-red pigments without toxic metals", Letters to Nature, vol. 404, Apr. 27, 2000, pp. 980-982.
V. Urade et al., "Photoelectrochemical Generation of Hydrogen", www.engineering.purdue.edu, Mar. 28, 2006, pp. 1-5.

* cited by examiner

*Primary Examiner*—Bruce F Bell
(74) *Attorney, Agent, or Firm*—Francis T. Coppa

(57) ABSTRACT

A photoelectrolysis cell is described herein. The cell includes a photoelectrode based on a material having the general formula $(Ln_{1-x}M_x)(Nb_{1-y}Ta_y)O_{1+x}N_{2-x}$. Ln is at least one lanthanide element; M is at least one alkaline earth metal; $0 \leq x \leq 0.99$; and $0 \leq y \leq 1$. The photoelectrolysis cell further includes a counter-electrode formed from at least one metal or metallic alloy. An electrolyte which is in contact with both the photoelectrode and the counter-electrode is another component of the cell, along with a means for collecting hydrogen produced by the cell. A related process for producing hydrogen in a photoelectrolysis cell is also described.

25 Claims, 1 Drawing Sheet

PHOTOELECTROLYSIS CELLS, AND RELATED DEVICES AND PROCESSES

BACKGROUND OF THE INVENTION

This invention relates generally to the production of hydrogen and oxygen by the electrolysis of water. In some specific embodiments, the invention is directed to the production of hydrogen by the photoelectrolysis of water, using solar radiation.

The conversion of sunlight and water into a clean, high-efficiency chemical fuel has been of great interest for a number of years. The need for such technology is more urgent as the damaging effects of burning fossil fuels has become apparent. The photolysis of water to yield hydrogen and oxygen has been demonstrated, via the visible light illumination of Group II-sulfides and selenides, such as CdS, CdSe, ZnS, and the like. Water has also been photolyzed under ultraviolet light illumination, using compounds such as $TiO_2$, $BaTiO_3$, and ZnO.

Photoelectrolytic devices are in many ways similar to photovoltaic devices, which include a p-n junction. In the case of photoelectrolytic devices, the p-n junction is usually replaced by a p-electrolyte-n junction (or metal-electrolyte-n junction). Electron-hole pairs are generated by the absorption of light in the semiconductor electrodes. (The semiconductor electrodes can be thought of as "photocatalysts"). The electron-hole pairs are separated within the photocatalyst, and are injected at the respective electrodes to produce electrochemical oxidation and reduction reactions. In the case of an n-type electrode, holes combine with water molecules ($H_2O$) to produce an anodic oxidation reaction. The reverse reaction occurs at a p-type (or metal electrode), where electrons combine with protons (H+), to produce a cathodic reduction reaction. The net effect is a flow of electrons from the anode to the cathode, resulting in reduction at the latter (hydrogen formation), and oxidation at the former (oxygen formation).

Clearly, photoelectrolysis has the potential to provide an inexpensive source of hydrogen, while also providing a way to efficiently store energy obtained from solar energy conversion. However, photoelectrolytic processes continue to have serious drawbacks. For example, the processes can be relatively slow and inefficient. The poor efficiency is due in large part to the bandgap characteristic of the photocatalyst(s) employed in the photoelectrolytic cells. ("Bandgap energy" can be defined as the difference between the reduction potential and the oxygen potential of the cell). Using related terminology, the "bandgap" is considered to be the amount of energy required to promote an electron, within its orbital configuration, from the valence band to the conduction band. Consequently, solar radiation which has an energy value less than the bandgap does not generate the electron-hole pairs required for the electrochemical reactions described above. Most known photocatalysts have bandgaps which are too large for the efficient photoelectrochemical splitting of water, i.e., only a small portion of the solar spectrum participates in photocatalysis.

Various attempts have been made to improve the efficiency of the photoelectrochemical cells. For example, semiconductors based on materials like $TiO_2$ often incorporate an external electrical bias, i.e., in addition to the basic photon energy input. (In the case of $TiO_2$, the alignment of the band gap with the oxidation and reduction potential of water is not ideal for some electrolysis systems). The bias can function to satisfy the energy balance for the relevant oxidation-reduction equation, e.g., by providing a better potential difference between band energies and the redox potential of water. The necessary cell reactions can therefore proceed more efficiently. However, use of a large electrical bias diminishes the advantages of using solar radiation in the first place.

Tandem photoelectrolytic cells, which usually include two or more photocatalysts, have been used in an attempt to overcome the problems of having a single, inefficient photocatalyst. Various types of tandem cells have been designed. As an example, U.S. Pat. No. 6,936,143 (Graetzel) describes a photoelectrochemical system in which one photocell is mounted behind another cell. The design of the cells involves a color-based division for absorption of the emission spectrum. One cell which absorbs blue and green portions of the spectrum generates oxygen. The second cell includes a dye-sensitized mesoporous photovoltaic film. This cell converts yellow and red light from the spectrum, reducing protons in the first cell to hydrogen.

While tandem cells may sometimes provide greater photoelectrolytic efficiency, there are drawbacks associated with them as well. For example, the cell structure can be complex, and difficult to produce. Greater complexity often leads to higher manufacturing costs. Moreover, some of the non-oxide types of tandem cells can be susceptible to photo-induced corrosion. (Photo-oxidation usually occurs on the oxygen-generating side of the cell, where non-oxide surfaces tend to become oxidized, instead of liberating oxygen. According to the overall oxidation-reduction scheme, if the oxide layer becomes thick enough, then the photo-induced generation of hydrogen will diminish, effectively shutting down the cell).

With some of these concerns in mind, improved photoelectrolytic devices would be welcome in the art. The devices should be capable of producing hydrogen efficiently and economically. Novel photocatalysts used in such devices would also be of great interest. The photocatalysts would be capable of functioning as one or more semiconductor electrodes for the device, and should be obtainable and usable at reasonable cost. More specifically, the photocatalysts should exhibit bandgap characteristics which permit very effective absorption of solar radiation and conversion to hydrogen.

BRIEF DESCRIPTION OF THE INVENTION

One embodiment of this invention is directed to a photoelectrolysis cell, comprising:

(a) a photoelectrode, comprising

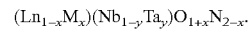

$$(Ln_{1-x}M_x)(Nb_{1-y}Ta_y)O_{1+x}N_{2-x}.$$

wherein Ln is at least one lanthanide element;

M is an alkaline earth metal selected from the group consisting of calcium, strontium, barium, and combinations thereof;

$0 \leq x \leq 0.99$; and $0 \leq y \leq 1$;

(b) a counter-electrode comprising at least one metallic material;

(c) an electrolyte in contact with both the photoelectrode and the counter-electrode; and (d) means for collecting hydrogen produced by the cell.

Another embodiment is directed to a method for producing hydrogen in a photoelectrolysis cell which comprises a photoelectrode and a counter-electrode, each electrode being in contact with an electrolyte; wherein the electrodes are also connected (directly or indirectly) through an electrical circuit capable of carrying an electrical load. The method comprising the following steps:

(i) exposing the photoelectrode to solar radiation, so as to initiate electrochemical oxidation and reduction reactions which result in the evolution of hydrogen at one of the electrodes; and (ii) collecting the hydrogen. The photoelectrode comprises a material having the formula $(Ln_{1-x}M_x)(Nb_{1-y}Ta_y)O_{1+x}N_{2-x}$, as set forth above.

Still another embodiment is directed to the photoelectrode itself, formed of the material described herein. The photoelectrode is useful for a variety of electrochemical reactions. Various features and advantages for these embodiments will become apparent from a review of the following specification.

DETAILED DESCRIPTION OF THE INVENTION

Figure 1:
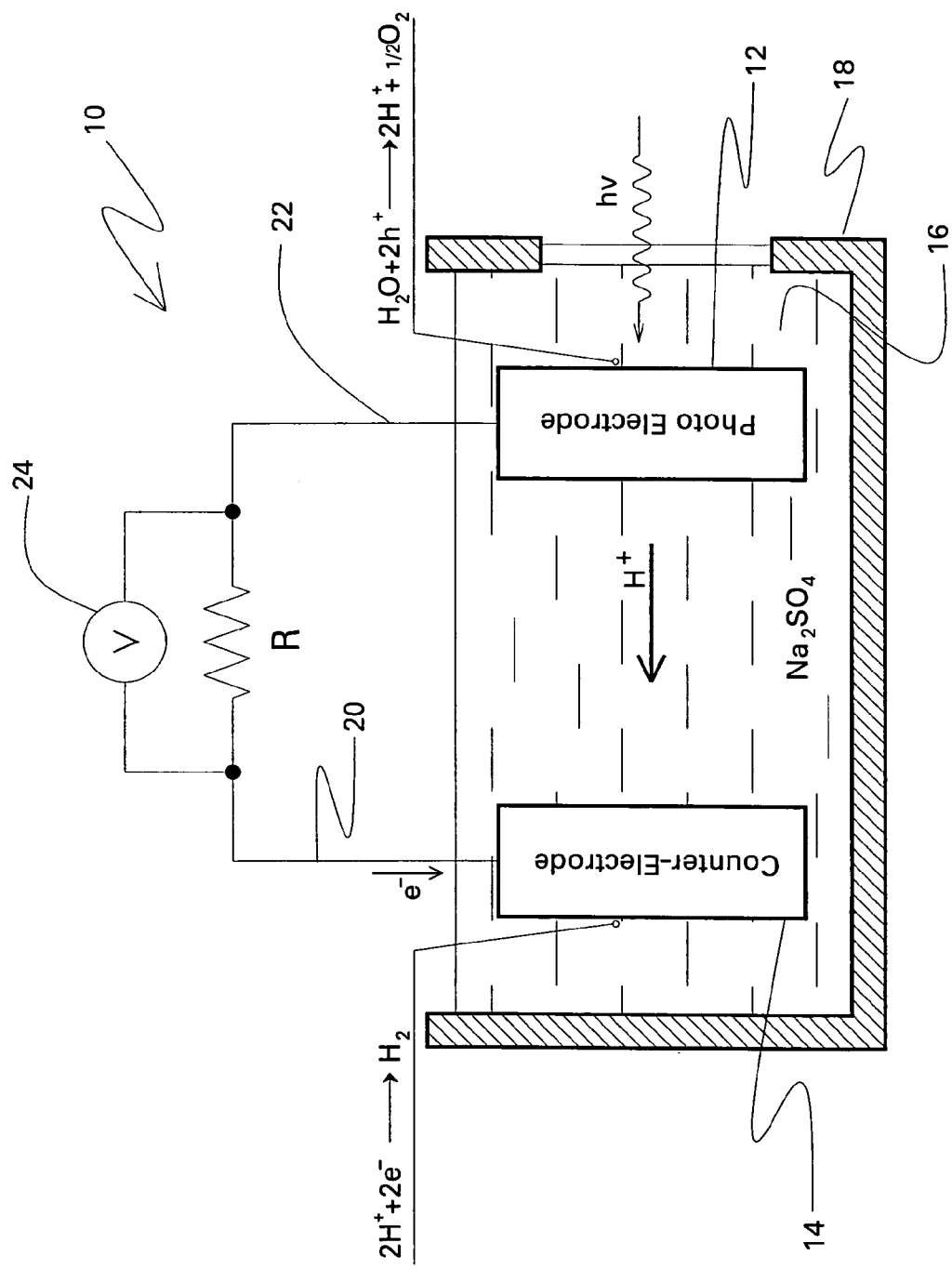
FIG. 1 is a schematic cross-section depicting a photoelectrolysis device according to some embodiments of the invention.

The photoelectrolysis cell of the present invention can assume a number of structural configurations. Photoelectrolytic cells are described in many references. Non-limiting examples include U.S. Pat. No. 4,090,933 (Nozik) and U.S. Pat. No. 4,172,925 (Chen et al), which are both incorporated herein by reference. Typically, the photoelectrolysis cell includes a photoelectrode and a counter-electrode, which can be connected to each other in various ways. For example, each electrode could be partially or fully immersed in a liquid electrolyte, and spaced from the other. The electrodes could also be incorporated into a conventional electrical circuit with suitable conductors, as depicted in FIG. 1 (discussed below).

However, other conventional electrode structures are also possible. For example, the photoelectrode and the counter-electrode could be physically attached to each other, e.g., without the need for wire connections between them. In some cases, the photoelectrode (e.g., a photoanode) could be formed (in situ), coated or otherwise applied to a surface of the counter-electrode (e.g., a photocathode). Those skilled in the art will be able to readily select the most appropriate electrode structure for a given end use application.

The photoelectrode comprises a material having the formula $$(Ln_{1-x}M_x)(Nb_{1-y}Ta_y)O_{1+x}N_{2-x} \qquad (I)$$

In formula (I), Ln is at least one lanthanide element; and x and y are values within the ranges described above. (Each "x" value is taken individually, e.g., it can differ in quantity from the other). In some embodiments, the lanthanide can be any of the rare earth elements, i.e., lanthanum, cerium, praseodymium, neodymium, promethium, samarium, europium, gadolinium, terbium, dysprosium, holmium, erbium, thulium, ytterbium, and lutetium. Mixtures of two or more of the lanthanides are also possible. For the purpose of this disclosure, yttrium and scandium are also considered to be a part of the lanthanide family. (Those skilled in the art understand that yttrium and scandium are chemically similar to members of the rare earth group).

A specific group of lanthanides for some embodiments comprises at least one of lanthanum, yttrium, gadolinium, lutetium, scandium, neodymium, and praseodymium. In some preferred embodiments, the lanthanide is selected from the group consisting of lanthanum, lutetium, yttrium, and various combinations thereof.

In formula (I), "M" is an alkaline earth metal, selected from the group consisting of calcium, strontium, barium, and combinations thereof. These alkaline earth metals are optional, and can be used in some cases to control the band gap value in the host lattice of the compound. In some specific embodiments, calcium and strontium are the preferred alkaline earth metals, with calcium often being most preferred.

As shown in formula (I), the photoelectrode material also includes at least one transition metal selected from tantalum and niobium. Tantalum is the preferred transition metal for most embodiments. Combinations of tantalum and niobium are also possible.

The presence of the oxynitride species in formula (I) provides a degree of photostability to the compound. (Nitrogen is less electronegative than oxygen, and oxynitride compounds have a much lower tendency to oxidize than pure nitride compounds). Over a period of time, some portion of oxygen may be incorporated into the lattice structure of the compound. For example, the oxygen may form oxides, e.g., various lanthanide-tantalum-oxide compounds. These oxides can function as a thin, protective layer for the photoelectrode. Although the inventors do not wish to be bound by this theory, it appears that the presence of such a protective layer would increase the stability of the electrode, without impeding the electrochemical activity of the electrode within the photoelectrochemical cell.

In some preferred embodiments, the photoelectrode (e.g., the anodic electrode) should have a bandgap energy value ($E_g$) of less than about 2.5. Compounds with this bandgap characteristic are thought to be more efficient in the photoelectrochemical splitting of water, and can thereby utilize a greater portion of the solar spectrum for hydrogen production. Usually, the photoelectrode will have a bandgap energy in the range of about 1.5 to about 2.0.

Non-limiting examples of specific compounds for the photoelectrode are as follows: $LaTaON_2$; $LuTaON_2$; $LaNbON_2$; $La_{0.5}Ca_{0.5}TaO_{1.5}N_{1.5}$; $GdTaON_2$; $NdTaON_2$; $YTaON_2$; $GdNbON_2$; $NdNbON_2$; and various combinations thereof. In some preferred embodiments, the photoelectrode comprises $LaTaON_2$. Choice of a particular compound will depend on various factors. They include: the specific type of photoelectrochemical cell (e.g., the type of electrode and counter-electrode employed); the amount of hydrogen production required from the cell; various processing considerations; and material costs.

Those skilled in the art are familiar with methods for making the photoelectrode materials. As an example, suitable techniques are described in U.S. Pat. No. 5,439,660; "Inorganic Yellow-Red Pigments Without Toxic Metals", M. Jansen et al Nature, Vol. 404, Apr. 27, 2000, pp. 980-982; and in "Recent Progress of Visible-Light-Driven Heterogeneous Photocatalysts for Overall Water Splitting", D. Yamasita et al, Solid State Ionics, 172 (2004), 591-595. Each of these disclosures is incorporated herein by reference. Typically, synthesis is carried out in the solid state. For example, a lanthanide oxide can be dry-mixed with tantalum oxide and/or niobium oxide, and then heated in a suitable reactor, under the flow of a nitrogen-containing gas like ammonia. Many variations on the process are possible.

The counter-electrode for the photoelectrolysis cell can be formed from a variety of conventional metallic materials, e.g., pure metals, metal oxides, or metal alloys. Some of them are described in U.S. Pat. No. 4,466,869 (Ayers), which is incorporated herein by reference, as well as in other references which relate to various photolytic processes. Non-limiting examples of suitable counter-electrode materials include Group VIII metals, such as iron, cobalt, nickel, rhodium, ruthenium, palladium, osmium, iridium, platinum, and various combinations thereof. In some specific embodiments, the counter-electrode material comprises nickel, platinum, palladium, or combinations thereof. Choice of a particular material for the counter-electrode will depend in part on many of the parameters set forth above for the photocathode.

In most embodiments, the photoelectrode for the electrolysis cell is an anodic electrode comprising an n-type material. (In such a case, photo-oxidation occurs at the photoelectrode, and oxygen is formed). However, it should be understood that the photoelectrode material described herein could alternatively be used to form a cathodic, p-type electrode material. (Those skilled in the art understand that various, well-known doping techniques are used to determine the conductivity characteristics of the electrode material). In such a case, the principles of operation for the photoelectrolysis cell would generally remain the same, although electrical current would flow in the opposite direction, as compared to the depiction of FIG. 1 (further described below). In this alternative embodiment, photo-reduction occurs at the photoelectrode, where hydrogen is formed. Thus, the counter-electrode would function as the anode, i.e., the site where photo-oxidation is occurring, and oxygen is formed.

Conventional electrolytes can be used in the photoelectrolysis cell. Usually, the electrolyte is a liquid, and can be acidic, basic, or neutral. The electrolyte often comprises an aqueous solution, or some other type of polar solvent, such as methanol, ethanol, and the like. In some preferred embodiments, the electrolyte is basic, and includes a compound such as sodium hydroxide, potassium hydroxide calcium hydroxide, sodium sulfate; or combinations comprising any of the foregoing, to provide a solution having a pH greater than about 7. As those skilled in the art understand, the electrolyte can include other conventional constituents as well. In some embodiments, the electrolyte composition is one which is substantially non-reactive with either the photoelectrode or the counter-electrode, so that unwanted side reactions can be prevented. It is also usually preferable that the electrolyte be free of constituents which would significantly "plate out" onto the electrodes during operation of the cell.

FIG. 1 is a schematic cross-section which depicts the structure of a photoelectrolysis device according to one embodiment of the present invention. Cell 10 includes photoelectrode 12 (here, the anode), and counter-electrode 14 (here functioning as the cathode). Each electrode is immersed in electrolyte 16, which itself is contained in any conventional vessel 18. Photoelectrode 12 is capable of absorbing visible light ("hv") in the desired bandgap values set forth previously. In some embodiments, counter-electrode 14 is transparent, and also capable of absorbing visible light.

Conductors 20 and 22 provide connection for the photoelectrode and counter-electrode to a conventional electrical load 24. As those of skill in the art understand, a switch (not shown) may also be incorporated into the electrical circuit. When the circuit is closed, the primary reaction which occurs at the photoelectrode (anode) generates oxygen:

$$H_2O+2h^+ \rightarrow 2H^+ + \tfrac{1}{2}(O_2) \qquad (I).$$

The primary reaction which occurs at the counter-electrode (cathode) generates hydrogen:

$$2H^+ + 2e^- \rightarrow H_2 \qquad (II),$$

wherein holes are designated as "$h^+$" and electrons are designated as "$e^-$". As those skilled in the art understand (e.g., see the Nozik patent), reactions (I) and (II) occur simultaneously in an aqueous electrolyte. The incoming light (radiation) is usually described in terms of "hv" (see FIG. 1), wherein "h" is Planck's constant ($6.62 \times 10^{-27}$ erg sec), and "v" is the frequency of radiation in $sec^{-1}$. The incoming radiation hv must be equal or greater than the bandgap energy $E_g$, in order to generate the electron-hole pairs. According to embodiments of the present invention, the use of the specific photoelectrodes described previously surpasses these bandgap energy requirements, so that the conversion efficiency of solar radiation can be increased considerably.

Those skilled in the art understand that many variations in the design of photoelectrolysis cell 10 are possible. The alternative designs are described in a variety of references, including some of the patents mentioned in this disclosure. It is expected that the use of the photoelectrodes described herein will provide notable improvements in various aspects of these other types of cells. Moreover, each type of photoelectrolysis cell described in the literature may include a variety of features not specifically set forth herein. Thus, photoelectrolysis cells which include such features are also considered to be part of the scope of this invention.

The collection and storage of hydrogen gas produced by photoelectrolysis cell 10 is readily accomplished by conventional techniques, e.g., see U.S. Pat. No. 4,090,933, referenced above. As an example, pressurizable tanks (not shown) could be used to store the gas which typically bubbles up through the electrolyte as it is produced. (Frequently, the gas is dried and compressed after being generated in the cell). Moreover, the hydrogen can be absorbed by various metals, e.g., to form reversibly-decomposable metal hydrides or other compounds. Those skilled in the art will be able to determine the most appropriate storage system for a given situation. Methods for collecting and storing other gasses produced in the cell, such as oxygen, are also known in the art.

It should thus be apparent that the photoelectrolysis cell described herein can be used to carry out various important objectives. For example, the cell can produce both hydrogen and oxygen. Both gases are very useful for a variety of applications. Moreover, the cell can efficiently convert solar radiation to electrical energy.

Some of the embodiments of special interest relate to hydrogen production. The hydrogen produced by the photoelectrolysis cell can be used in any application requiring the gas. Non-limiting examples include fuel cells; internal combustion engines; turbines or other types of engines which rely on hydrogen fuel; and chemical processes which require hydrogen, e.g., hydrogenation systems. Those skilled in the art are familiar with the design of systems and processes which employ hydrogen gas.

A number of embodiments have been described herein. However, further variations and modifications of this disclosure will be apparent to those skilled in the art, and should be considered to be within the scope of this invention.

What is claimed:

1. A photoelectrolysis cell, comprising:
   (a) a photoelectrode, comprising $$(Ln_{1-x}M_x)(Nb_{1-y}Ta_y)O_{1+x}N_{2-x};$$

wherein Ln is at least one lanthanide element selected from the group consisting of cerium, praseodymium, neodymium, promethium, samarium, europium, gadolinium, terbium, dysprosium, holmium, erbium, thulium, ytterbium, lutetium, yttrium and scandium;
   M is an alkaline earth metal selected from the group consisting of calcium, strontium, barium; and combinations thereof;
   $0 \leq x \leq 0.99$; and $0 \leq y \leq 1$;
   (b) a counter-electrode comprising at least one metallic material;
   (c) an electrolyte in contact with both the photoelectrode and the counter-electrode; and
   (d) means for collecting hydrogen produced by the cell.

2. The photoelectrolysis cell of claim 1, wherein the photoelectrode has a bandgap energy value of less than about 2.5.

3. The photoelectrolysis cell of claim 2, wherein the photoelectrode has a bandgap energy value in the range of about 1.5 to about 2.0.

4. The photoelectrolysis cell of claim 1, wherein the lanthanide element is selected from the group consisting of yttrium, gadolinium, lutetium, scandium, neodymium, praseodymium, and combinations of any of the foregoing.

5. The photoelectrolysis cell of claim 1, wherein the photoelectrode comprises a material selected from the group consisting of $LuTaON_2$; $GdTaON_2$; $NdTaON_2$; $YTaON_2$; $GdNbON_2$; $NdNbON_2$; and combinations thereof.

6. The photoelectrolysis cell of claim 1, wherein the photoelectrode comprises $LuTaON_2$.

7. The photoelectrolysis cell of claim 1, wherein the counter-electrode is selected from the group consisting of metals, metallic alloys, metal oxides, and combinations thereof.

8. The photoelectrolysis cell of claim 7, wherein the counter-electrode comprises a material selected from the group consisting of iron, cobalt, nickel, rhodium, ruthenium, palladium, osmium, iridium, platinum, and combinations thereof.

9. The photoelectrolysis cell of claim 1, wherein the photoelectrode is an anodic, n-type electrode.

10. The photoelectrolysis cell of claim 1, wherein the photoelectrode is a cathodic, p-type electrode.

11. The photoelectrolysis cell of claim 1, wherein the electrolyte is a liquid in which the photoelectrode and the counter-electrode are at least partially immersed.

12. The photoelectrolysis cell of claim 11, wherein the liquid electrolyte has a pH greater than about 7.

13. The photoelectrolysis cell of claim 1, wherein the photoelectrode is transparent to the passage of solar radiation.

14. A photoelectrolysis cell for producing hydrogen, comprising:
(I) an anodic electrode, comprising at least one n-type material selected from the group consisting of $LuTaON_2$; $GdTaON_2$; $NdTaON_2$; $YTaON_2$; $GdNbON_2$; and $NdNbON_2$;
(II) a cathodic counter-electrode, comprising a material selected from the group consisting of iron, cobalt, nickel, rhodium, ruthenium, palladium, osmium, iridium, platinum, and combinations thereof,
(III) means for retaining an electrolyte in contact with both the anodic electrode and the cathodic counter-electrode; and
(IV) means for collecting hydrogen produced by the cell.

15. The photoelectrolysis cell of claim 14, wherein the electrolyte comprises a liquid composition having a pH greater than about 7; and at least a portion of both the anodic electrode and the cathodic counter-electrode are immersed in the liquid composition.

16. The photoelectrolysis cell of claim 15, wherein the anodic electrode and the cathodic counter-electrode are also in contact with each other through at least one conductor which carries an electrical load, so that an electrical circuit can be formed through the cell.

17. A photoelectrode, comprising a material having the formula $$(Ln_{1-x}M_x)(Nb_{1-y}Ta_y)O_{1+x}N_{2-x}$$

wherein Ln is at least one lanthanide element selected from the group consisting of cerium, praseodymium, neodymium, promethium, samarium, europium, gadolinium, terbium, dysprosium, holmium, erbium, thulium, ytterbium, lutetium, yttrium and scandium;

M is an alkaline earth metal selected from the group consisting of calcium, strontium, barium; and combinations thereof;
$0 \leq x \leq 0.99$; and $0 \leq y \leq 1$.

18. An n-type, anodic photoelectrode according to claim 17.

19. The photoelectrode of claim 17, comprising a material selected from the group consisting of $LuTaON_2$; $GdTaON_2$; $NdTaON_2$; $YTaON_2$; $GdNbON_2$; and $NdNbON_2$.

20. A method for producing hydrogen in a photoelectrolysis cell which comprises a photoelectrode and a counter-electrode, each electrode being in contact with an electrolyte; wherein the electrodes are also connected through an electrical circuit capable of carrying an electrical load, said method comprising the steps of:
(i) exposing the photoelectrode to solar radiation, so as to initiate electrochemical oxidation and reduction reactions which result in the evolution of hydrogen; and
(ii) collecting the hydrogen;

wherein the photoelectrode comprises a material having the formula $$(Ln_{1-x}M_x)(Nb_{1-y}Ta_y)O_{1+x}N_{2-x}$$

wherein Ln is at least one lanthanide element selected from the group consisting of cerium, praseodymium, neodymium, promethium, samarium, europium, gadolinium, terbium, dysprosium, holmium, erbium, thulium, ytterbium, lutetium, yttrium and scandium;

M is an alkaline earth metal selected from the group consisting of calcium, strontium, barium, and combinations thereof;
$0 \leq x \leq 0.99$; and $0 \leq y \leq 1$.

21. The method of claim 20, wherein the photoelectrode has a bandgap energy value less than about 2.5.

22. The method of claim 21, wherein the photoelectrode has a bandgap energy value in the range of about 1.5 to about 2.0.

23. The method of claim 20, wherein the photoelectrode comprises at least one material selected from the group consisting of $LuTaON_2$; $GdTaON_2$; $NdTaON_2$; $YTaON_2$; $GdNbON_2$; and $NdNbON_2$.

24. The method of claim 20, further comprising the step of directing the hydrogen produced by the photoelectrolysis cell to at least one hydrogen-consuming system selected from the group consisting of fuel cells; turbine engines; internal combustion engines; chemical process operations, and combinations thereof.

25. A method for carrying out a photoelectrolysis reaction in a photoelectrolysis cell which comprises a photoelectrode and a counter-electrode, each electrode being in contact with an electrolyte; wherein the electrodes are also connected through an electrical circuit capable of carrying an electrical load, said method comprising the step of exposing at least one of the electrodes to solar radiation, so as to initiate electrochemical oxidation and reduction reactions which are characteristic of photoelectrolysis;

wherein the photoelectrode comprises a material having the formula $$(Ln_{1-x}M_x)(Nb_{1-y}Ta_y)O_{1+x}N_{2-x}$$

wherein Ln is at least one lanthanide element selected from the group consisting of cerium, praseodymium, neodymium, promethium, samarium, europium, gadolinium, terbium, dysprosium, holmium, erbium, thulium, ytterbium, lutetium, yttrium and scandium;

M is an alkaline earth metal selected from the group consisting of calcium, strontium, barium, and combinations thereof;
$0 \leq x \leq 0.99$; and $0 \leq y \leq 1$.

* * * * *